United States Patent
Zimmerle

[15] 3,663,048
[45] May 16, 1972

[54] VEHICLE BUMPER INSTALLATION
[72] Inventor: Wilbur J. Zimmerle, Bellbrook, Ohio
[73] Assignee: General Motors Corporation, Detroit, Mich.
[22] Filed: Apr. 3, 1970
[21] Appl. No.: 25,360

[52] U.S. Cl. .............................293/84, 293/91, 293/DIG. 3, 267/142, 188/1 C
[51] Int. Cl. ......................................................B60r 19/08
[58] Field of Search......................293/84, 85, 87, 91, 92, 93, 293/94; 267/8, 42; 188/1 C

[56] References Cited

UNITED STATES PATENTS

| | | | |
|---|---|---|---|
| 1,468,868 | 9/1923 | Reichstetter et al.....................293/92 |
| 1,697,204 | 1/1929 | Nomicos..................................293/85 |
| 3,026,972 | 3/1962 | Hendry et al...........................188/1 C |
| 759,507 | 7/1903 | Ericson et al............................267/42 |

FOREIGN PATENTS OR APPLICATIONS

| | | | |
|---|---|---|---|
| 658,945 | 6/1928 | France.....................................293/85 |
| 452,217 | 5/1913 | France......................................267/8 |
| 522,448 | 8/1928 | Germany................................293/91 |

Primary Examiner—Arthur L. La Point
Assistant Examiner—Robert Saifer
Attorney—D. L. Ellis and W. E. Finken

[57] ABSTRACT

An energy dissipating bumper installation for vehicles includes a transversely extending bumper bar mounted to the vehicle frame at transversely spaced locations on the cross member thereof by energy dissipating bumper mounted assemblies, each assembly including a generally elliptically shaped spring unit attached at opposite sides thereof along its minor axis to the cross member and to the bumper and having attached across its major axis an irreversible energy dissipating tension strut adapted to provide controlled resistance to flattening tendencies of the spring unit under impact forces applied to the bumper bar.

3 Claims, 5 Drawing Figures

PATENTED MAY 16 1972 3,663,048

INVENTOR.
Wilbur J. Zimmerle
BY O. L. Ellis
ATTORNEY

VEHICLE BUMPER INSTALLATION

This invention relates to vehicle bumpers and more particularly to an energy dissipating collision bumper installation for automotive vehicles.

This invention has as its primary feature the provision of an energy dissipating vehicle bumper installation including a collision bumper bar extending transversely of the vehicle and mounted to an end cross member of the frame thereof by two or more bumper mounting units comprising elliptical spring members adapted to undergo elastic strain under impact forces applied to the bumper bar, such spring units being further provided across their major axes with tension struts operative to present a controlled resistance to and an irreversible dissipation of the energy of the impact forces tending to flatten the elliptical spring.

The energy dissipating means may take the form of either a viscous damper type tension strut, as for example a piston and sleeve unit utilizing a hydraulic medium to resist telescopic extension thereof under tension forces, or alternatively may take the form of a telescopic sleeve and rod unit provided with extrusion or metal upsetting conformation to achieve irreversible energy dissipation. In the case of the latter, the sleeve and rod unit may be employed to prestress the elliptical spring from a preformed unstressed elliptical shape to a deeper elliptical shape across its minor axis whereby larger displacement or flattening is available to the spring units and the bumper bar under collision forces.

More specifically, the elliptically shaped spring unit is adapted for attachment at opposite sides to the frame cross member and bumper bar on flat faces thereof, the spring unit having such a specific shape including front and back portions engaged on these flat faces and generally semicircular end portions that successive portions of the front and back portions are engageable with the frame and bumper faces to flatten thereover while the end portions remain semicircular but of successively smaller diameter.

In the preferred embodiment, the elliptical spring unit comprises several elliptical layers made into a unit to insure elastic action throughout its excursion while exhibiting high deflection rate.

These and other features and advantages of the invention will be readily apparent from the following specification and from the drawings wherein.

Figure 1:
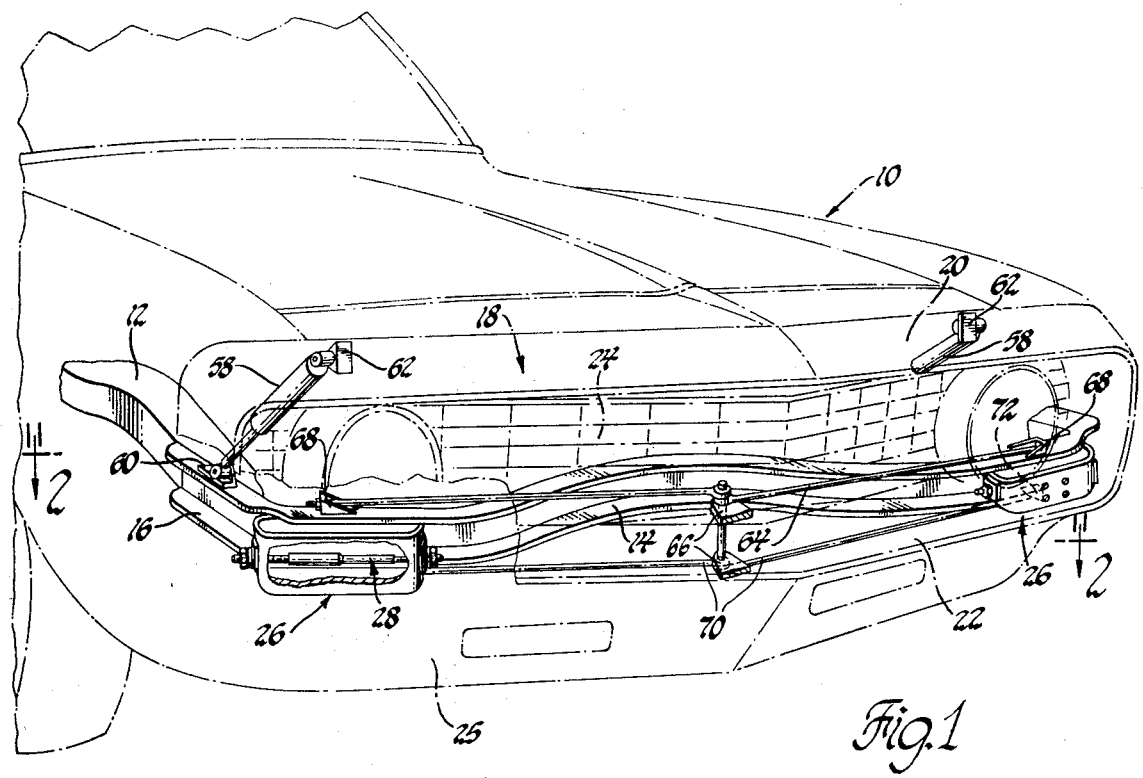
FIG. 1 is a partially phantom fragmentary perspective view of an automotive vehicle having a vehicle bumper installation according to this invention.

Referring now particularly to FIG. 1 of the drawings, there is illustrated therein in phantom the front end portion of an automotive vehicle designated generally as 10 including a chassis frame conventionally comprised of longitudinally extending side rails such as indicated at 12, adapted to be joined at the forward extremities thereof by a front cross member. It is to be understood that while the drawings illustrate a separate chassis-frame, the invention is equally well applied to vehicles employing unibody construction wherein the rigidifying frame and body sheet metal components are fabricated integrally with each other.

A front collision bumper installation, according to this invention, includes a specially adapted front frame cross member 14 of generally U-shape in plan view and including rearwardly extending legs 16 welded or otherwise attached to the forward extremities of the front side rails 12. A generally oval-shaped in elevation bumper or collision bar 18 including upper and lower transverse portions 20 and 22 defines, as illustrated, a grille opening therebetween for exposing a vehicle grille structure indicated at 24 mounted to the front body portion of vehicle 10 rearwardly of the forward extremities of the bumper 18. Bumper 18 is designed in conjunction with the two front fenders of the vehicle, the hood thereof, and the lower splash shield 25 below the grille suitably to permit telescoping of bumper 18 into the front end portion of the body under collision forces. Such telescoping is permitted by the bumper installation or mounting components to be described hereinafter. Further, if desired, the bumper 18 may be fabricated of a composite construction including an inner steel backbone having molded thereover a high density self-skinning polyurethane foam or other desired elastomer operative to resiliently sustain minor bumps and abrasions without damage.

Figure 2:
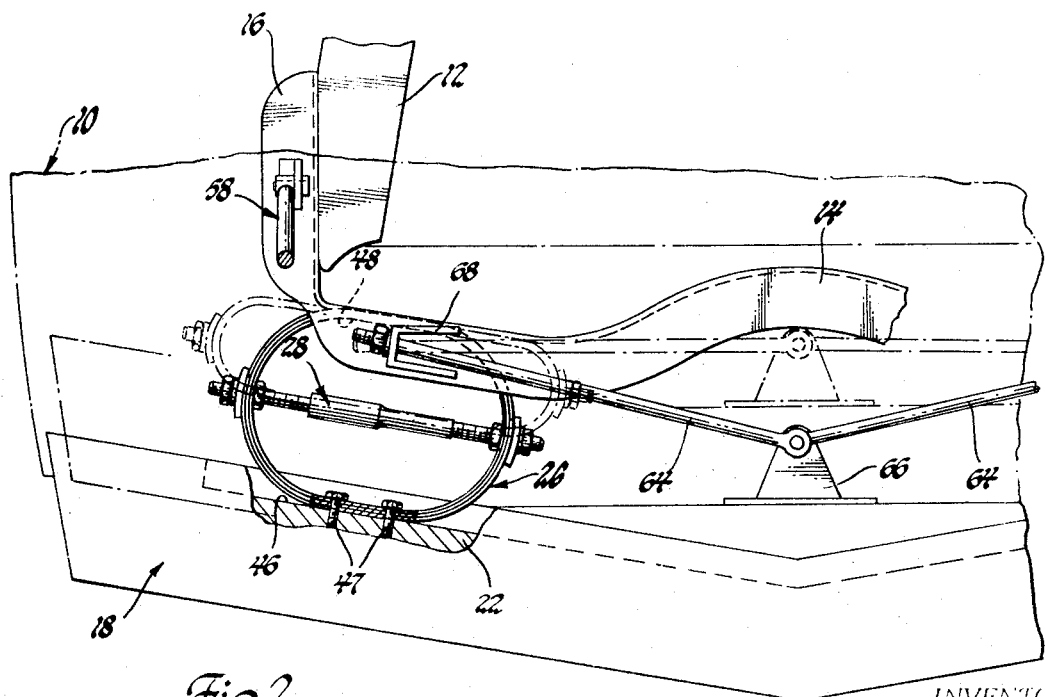
FIG. 2 is a horizontal sectional view taken generally along the plane indicated by lines 2—2 of FIG. 1.
Figure 3:
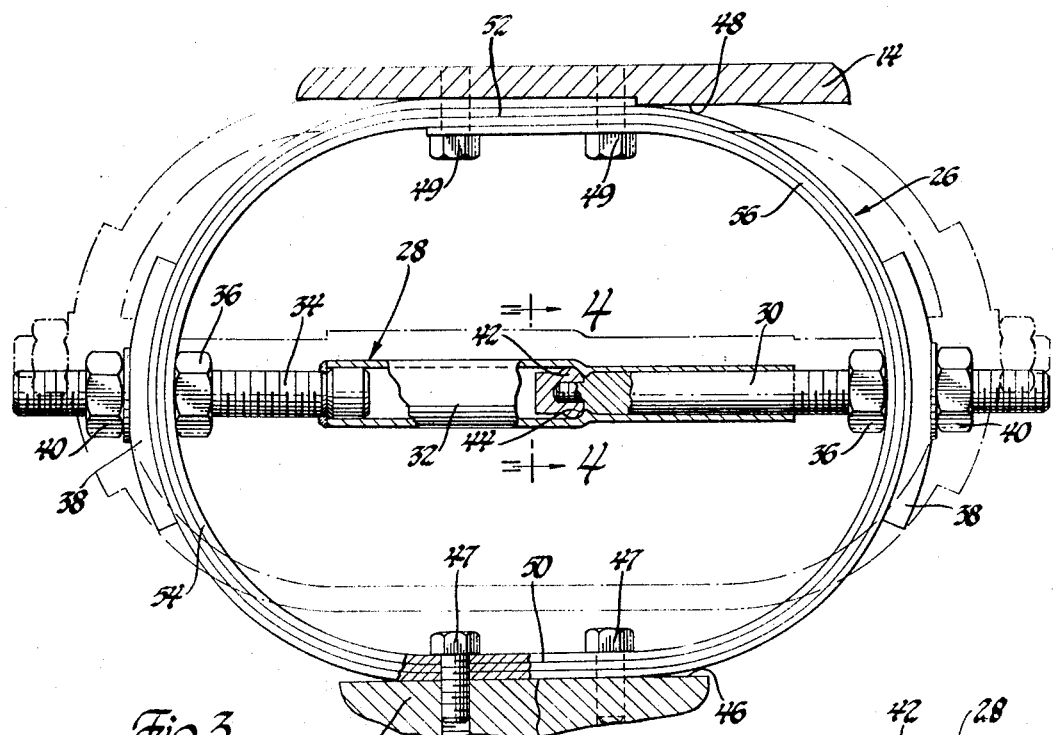
FIG. 3 is an enlarged view of a portion of FIG. 2 showing in broken and solid lines respectively normal and prestressed conditions of the elliptical spring unit.

Referring now more particularly to FIGS. 2 and 3, bumper 18 is mounted on vehicle 10 by a transversely spaced pair of elliptical spring units designated generally as 26. In a preferred form, each spring may be fabricated of a single length of steel band or strip wrapped over itself several times to provide several layers or laminations, with the two ends of the bar being secured together by localized welding at the terminal ends of alternatively held by fasteners as will be described. Considering that the spring unit 26 is to perform entirely elastically; i.e., without any onset of any substantial plastic strain when subjected to collision forces up to a predetermined maximum design level, it is desirable to provide such layers or laminations so that each layer may bend or elastically deform over substantial distance longitudinally of vehicle 10 without such plastic strain, rather than providing a single thick elliptical band which could perhaps sustain an equal load but with much less deflection without fracture or yield. The several laminations contribute jointly to the spring rate of the entire assembly and thus provide a high composite spring rate without undue tendency toward plastic strain. It will of course be appreciated that these objectives may be accomplished also with the aid of different selections of material having varying stress-strain characteristics. However, in the preferred embodiment, the laminated construction employs SAE 1070 steel wherein the band is 0.109 inches thick and has a vertical or height dimension in elevation of approximately 3 inches.

As seen best in FIG. 3, the spring units 26 are first fabricated into a preformed or normal unstressed condition shown in broken lines. When installed in the vehicle, however, the spring unit is prestressed to a deeper generally elliptical shape wherein the major and minor axes thereof are shorter and longer respectively than those of the unstressed condition. This prestress is accomplished by selected adjustment within a tension strut device 28 extending across the major axis of the spring unit. The tension strut, in a preferred form, comprises a rod 30 and a sleeve 32 telescopically joined together, with the leftward end of sleeve 32 having welded thereto one end of a threaded stud 34. The end of rod 30 is also threaded and nuts 36 are threaded onto rod 30 and stud 34 within the spring unit. The stud and rod extend through suitable opposed apertures in the spring unit band laminations to receive similarly apertured reinforcements 38, and a further pair of nuts 40 are threaded over the nut and rod into engagement with the reinforcements.

Figure 4:
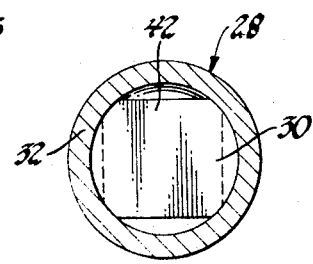
FIG. 4 is an enlarged sectional view taken generally along the plane indicated by lines 4—4 of FIG. 3.

As also indicated in FIG. 4, the internal end of rod 30 is provided with an enlarged extruding head 42 having flats formed at 90° intervals therearound to define a generally rectangular profile presented to a shoulder 44 of the sleeve 32 defined by smaller and larger diameter portions thereof. In its initial assembled state, tension is applied through strut 28 to bottom head 42 on shoulder 44 and the nuts 36 and 40 are tightened to deform the spring unit from the relatively shallow normal or unstressed condition shown in broken lines to the prestressed condition, shown in solid lines, whereupon the nuts are tightened and the spring units are ready for installation on the vehicle 10.

As indicated best in FIGS. 1 and 2, the prestressed spring units 26 are each mounted to the lower portion 22 of bumper 18 by four bolts 47 extending through apertures in the laminated band of the spring units. The spring units bands are engaged flushly on rigid load bearing steel backbone or other flat surfaces 46 formed on the rearward face of the bumper lower portion 22. Similarly, as indicated in FIG. 3, the spring units are mounted to flat surfaces 48 formed on the cross member 14, four bolts 49 again being employed to extend through apertures in the laminated band.

While being described as being generally of elliptical shape, it is seen from the drawings that spring units 26 most specifically take a semi-elliptical form since, with the aid of bolts 47 and 49, the spring units have front and back portions 50 and 52 which are flat, and generally semicircular end portions 54 and 56. This general characteristic of the shape is retained during deformation of the spring units under collision forces applied to bumper 18 and provides advantages to be described hereinafter.

With the bumper 18 so mounted at the lower end portion 22 thereof, additional installation components are provided to stabilize the bumper on the vehicle 10 against road induced vibration and include a pair of viscous damper units 58 each pinned at opposite ends to a bracket 60 on the cross member 14 and a bracket 62 on the upper portion 20 of the bumper. The damper units 58 are telescopic and allow for relative motion of bumper 18 telescopically into the front body sheet metal as previously described, yet provides sufficient damping or resistance to periodic low energy vibration induced by road irregularities so that the bumper does not shake in a vertical or longitudinal displacement mode to any objectionable degree about its lower spring mountings.

The spring units 26 and bumper 18 are constrained to deflect in generally longitudinal planes of the vehicle 10 through rods 64 extending between a bracket 66 centrally located on bumper 18 and through apertures in upper brackets 68 on cross member 14, and a similar pair of rods 70 extending between bracket 66 and similar brackets on the lower side of the cross member. Nuts are provided on the remote threaded ends of all of these rods to bottom on the cross member brackets when the bumper 18 is located in its normal extended position shown in solid lines in FIG. 2. As indicated in broken lines, rods 64 and 70 are laterally displaceable through the apertures in brackets 68 and 72 to the extent dictated by the rod geometry under collision forces telescoping bumper 18 rearwardly of the vehicle. However, it is seen that the pivot connections of the rods afforded at bracket 66 and by the nuts on the rod ends prevent any significant amount of lateral displacement of bumper 18 as might occur under a cornering impact at either side of the bumper.

In the event of collision forces applied to bumper 18 forcing the latter rearwardly of the vehicle, the spring units 26 are caused to elastically deform from their prestressed elliptical shape shown in solid lines in FIG. 2 to any flattened elliptical shape up to a maximum deflection condition shown in broken lines. As is seen, cross member 14 is bowed in plan view rearwardly in its central portion to allow for rearward excursion of bracket 66 to this maximum deflection condition. While so deflecting, tension strut 28 is operative to provide a controlled amount of resistance to elastic flattening of the spring unit bands and provides dissipation of the energy of the forces causing such flattening through the action of head 42 on rod 30. When collision forces of a predetermined magnitude sufficient to begin metal upsetting in sleeve 32 are so applied, the head extrudes progressive portions of the smaller diameter sleeve end as tension strut 28 is caused to lengthen or telescope under the forces causing the flattening or lengthening of the major axis dimension of the elliptical bands of the spring units. Depending upon the severity or energy of the collision on bumper 18, the elliptical springs may flatten to a small degree and the tension struts only slightly elongated or, in high energy impacts, the spring may flatten fully to the position indicated in broken lines in FIG. 2 and the tension strut elongated to a maximum length. With slight impacts, any irreversible energy dissipation and lengthening of tension strut 28 serves to reduce the prestress of the spring unit allowing it to take a shape more akin to its unstressed shape, and successive such impacts may remove the prestress entirely. It is of course understood that the elliptical bands always seek at least such unstressed shape after more severe impacts. However, the tension strut may be reused for subsequent energy dissipation under impacts by adjustment of nuts 36 and 40 on the threaded rod and stud to again telescope the tension strut into a tension bearing condition between the ends of the spring unit and prestressing of the latter. When sleeves 32 are fully expended, new tension struts may be installed.

As indicated in FIG. 2, the elliptical bands of the spring units tend to always seek the generalized shape indicated thereabove; i.e., flat front and back portions merging with semicircular end portions. During the elastic deflection of the elliptical bands, this is aided by successive portions of the semicircular end portions engaging the flat surfaces 46 and 48 of the cross member and bumper. These successively longer front and back portions remain joined by end portions taking successively smaller diameter semicircular shape due to the tendency of these end portions to distribute the stresses equally therearound. It has been found that this effect and the combination of factors just described which lead thereto result in the spring units 26 having a generally constant rate of deflection under a sustained load as the units undergo successively flattened shapes. The forces in the semicircular end portions and the deflected flat portions of the spring units do not tend toward an infinite value in fully flattened condition as with spring units of different shape, for example, those wherein the remote ends of the unit take an abrupt change in curvature, rather than semicircular, in the unstressed condition. It is to be noted that whether the collision forces applied to bumper 18 are of a relatively small value or sufficient to fully flatten the spring units, the latter always return the bumper to its unstressed condition bringing the bumper back to generally design location as shown in FIG. 1. As the tension struts 28 are gradually expended by repeated impacts, it is advantageous to readjust or replace them to again prestress the spring units since it is seen that such prestress affords a large displacement excursion of the resilient bands for a given strength of material and size of band lamination without loading the same to yield.

Figure 5:
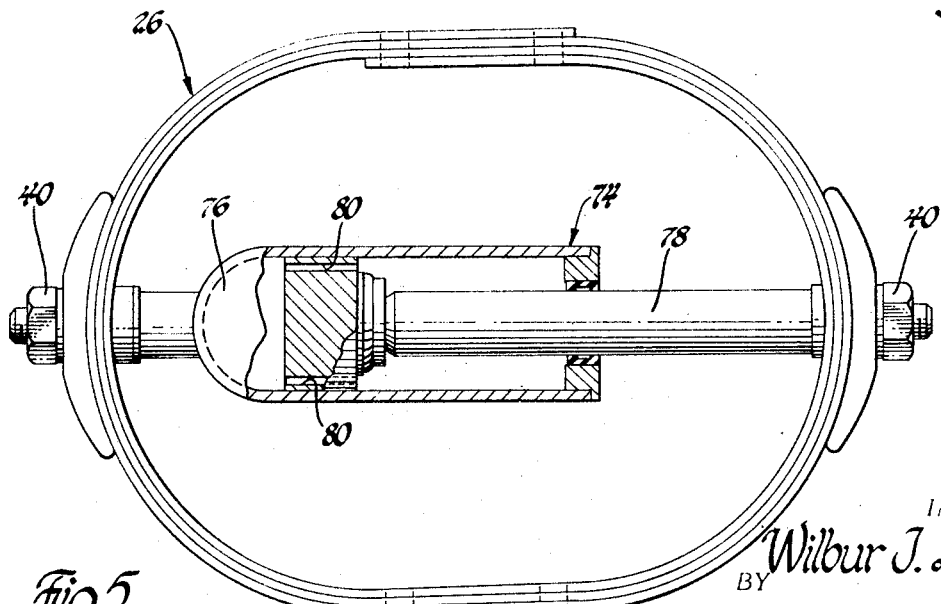
FIG. 5 is a view similar to FIG. 3 showing a modification of the elliptical spring unit.

In FIG. 5 is illustrated a modification of spring unit 26 wherein a viscous damper tension strut 74 includes cylinder and piston portions 76 and 78 attached to the spring band across its major axis. Orifices 80 in the piston head present resistance to flattening of the spring unit in much the same manner as described above, with a hydraulic medium contained in the chambers of the cylinder.

Having thus described the invention, what is claimed is:

1. Collision bumper apparatus for vehicles comprising a collision bumper member adapted to extend transversely across an end of a vehicle, a yieldable bumper mounting assembly including a band of resiliently deformable material joined at its ends to define a closed figure in plan view taking a predetermined generally elliptical shape in unstressed condition including generally semicircular end portions merging with generally flat front and back portions, an irreversible tension strut adjustably extending across the major axis of said elliptical band and adapted for attachment at its opposite ends thereto, the length of said tension strut being shorter than the major axis of said elliptical band, means attaching the opposite ends of said tension strut to said elliptical band causing the latter to be prestressed into an elliptical shape including generally semicircular end portions merging with generally flat front and back portions and having its major and minor dimensions shorter and longer respectively than that of said unstressed elliptical shape, said assembly further including means on said elliptical band located generally at the minor axis thereof attaching the full length of said front flat portion of said band to said bumper member, and means on said elliptical band opposite the last mentioned attaching means for attaching the full length of said back flat portion of said elliptical band to a vehicle whereby impact forces applied to said bumper are distributed evenly through said band semi-circular end portions.

2. Collision bumper apparatus for vehicles comprising a collision bumper member adapted to extend transversely across an end of a vehicle, a yieldable bumper mounting assembly including a band of resiliently deformable material joined at its ends to define a closed figure in plan view taking a predetermined generally elliptical shape in unstressed condition including generally semicircular end portions merging with generally flat front and back portions, a tension strut extending across the major axis of said elliptical band and adapted for attachment at its opposite ends thereto, the length of said tension strut being shorter than the major axis of said elliptical band and said tension strut including irreversibly deformable means for imparting a controlled resistance to lengthening of said strut under application thereto of tension loads above a predetermined value, means adjustably attaching the opposite ends of said tension strut to said elliptical band causing the latter to be prestressed, by tension in said strut below said predetermined value, into an elliptical shape including generally semicircular end portions merging with generally flat front and back portions and having its major and minor dimensions shorter and longer respectively than that of said unstressed elliptical shape, said adjustable attaching means being capable of adjustment compensating for a limited amount of deformation of said strut deformable means and reestablishing the desired prestress in said band after receipt of an impact force, said assembly further including a flat portion on said elliptical band located generally at the minor axis dimension thereof attaching the full length of the flat portion of said band to said bumper member and a flat portion on said elliptical band opposite the last mentioned attaching means for attaching the full length of the flat portion of said elliptical band to a vehicle whereby impact forces applied to said bumper are evenly distributed through said band semicircular end portions.

3. In a vehicle, collision bumper apparatus comprising, a vehicle structural frame member extending generally transversely of the vehicle at one end thereof and providing transversely spaced generally flat bumper mounting faces, a collision bumper member adapted to extend transversely of said end of the vehicle in spaced relation to said frame member, said bumper member providing flat mounting faces respective to and disposed oppositely of one of said mounting faces of said frame member, and at least a pair of elastically yieldable bumper mounting assemblies each located adjacent one end of said bumper member, each said assembly including a lamination unit of a plurality of resiliently deformable bands attached together and formed to define a generally elliptical unstressed shape in horizontal section, a tension strut extending across the major axis of said elliptical lamination unit and being shorter than the unstressed dimension thereof thereacross, means attaching the opposite ends of said strut to said unit causing the latter to take a prestressed elliptical shape having major and minor axis dimensions shorter and longer respectively than that of said unstressed shape, said stressed shape including opposite generally semicircular end portions merging with generally flat front and back portions, one of said front and back portions being attached to a flat mounting face of said bumper member while the other thereof is attached to a flat mounting face of said frame member, said elliptical band being elastically yieldable under forces applied to said bumper toward said frame member and while so deflecting having successive portions of said end portions thereof engageable on said flat faces to take the flat conformation thereof while the end portions take successively smaller diameter generally semicircular shape, said tension strut including telescopically related rod and sleeve members operative under tension in said strut above a predetermined value to cause irreversible deformation therein during lengthening thereof, and stabilizing linkage connecting said bumper member and said frame member to control displacement therebetween to occur strictly in longitudinal planes of the vehicle.

* * * * *